US007184553B2

(12) United States Patent
Mahlab et al.

(10) Patent No.: US 7,184,553 B2
(45) Date of Patent: Feb. 27, 2007

(54) METHOD AND SYSTEM FOR ENCRYPTION OF OPTICAL SIGNALS

(75) Inventors: Uri Mahlab, Or-Yehuda (IL); Michael Gutin, Petach-Tikva (IL)

(73) Assignee: ECI Telecom Ltd., Petach Tikva (IL)

( * ) Notice: Subject to any disclaimer, the term of this patent is extended or adjusted under 35 U.S.C. 154(b) by 755 days.

(21) Appl. No.: 10/067,390

(22) Filed: Feb. 7, 2002

(65) Prior Publication Data

US 2003/0147533 A1 Aug. 7, 2003

(51) Int. Cl.
*H04K 1/00* (2006.01)
*H04L 9/00* (2006.01)
*G02F 1/01* (2006.01)
*G02B 6/12* (2006.01)

(52) U.S. Cl. ...................... 380/256; 380/255; 380/257; 380/277; 380/278; 380/280; 380/285

(58) Field of Classification Search ................ 380/256, 380/255, 277, 278, 257, 280, 285
See application file for complete search history.

(56) References Cited

U.S. PATENT DOCUMENTS 5,570,438 A 10/1996 Fontana et al.
6,018,582 A * 1/2000 Francois et al. ............ 380/256
6,704,420 B1 * 3/2004 Goedgebuer et al. ....... 380/256
2002/0101632 A1 * 8/2002 Meckler ..................... 359/115

OTHER PUBLICATIONS

Patent Abstracts of Japan: JP 2000 235170 published Aug. 29, 2000, in the name of NEC Corp, entitled "Variable Dispersion Compensator".
Torres, et al, "Optical Encryption for High-Bit Rate Systems Using Fiber Bragg Gratings", SBMO/IFEE MTT-SIMOC '99 Proceedings, (Aug. 9, 1999) vol. 1, 83-85.
Torres, et al, "Security System for Optical Communication Signals with Fiber Bragg Gratings", IEEE Transactions on Microwave Theory and Techniques (Jan. 2002) vol. 50, No. 1, 13-16.
Annie Lindstrom, "Defeating Dispersion, Part II: To Reach 40 Gb/s, Carriers and Vendors Need to Get a Very Tight Grip on Chromatic Dispersion", *Telephony*, Dec. 4, 2000, www.internettelephony.com.
Abstract for JP 2000235170A2, Applicant: NEC CORP, Title: "Variable Dispersion Compensator", Issued Aug. 29, 2000 [online][retrieved on Oct. 2, 2002 from *The Delphion Integrated View*, http://www.delphion.com/details?pn+JP20235170A2].

* cited by examiner

*Primary Examiner*—Matthew Smithers
*Assistant Examiner*—Courtney D. Fields
(74) *Attorney, Agent, or Firm*—Browdy and Neimark, PLLC

(57) ABSTRACT

A method, a system and a device for encrypting an optical signal to be transmitted via an optical fiber communication link by causing controlled chromatic dispersion of said signal. The controllable decryption device, as well as the controllable decryption device, can be implemented in the form of a variable dispersion compensation module controlled by a decryption key. In the system, the encryption device and the decryption device are controlled in synchronism by an encryption key and a decryption key respectively, the keys preferably being functions of time symmetric with respect to the time axis.

19 Claims, 4 Drawing Sheets

METHOD AND SYSTEM FOR ENCRYPTION OF OPTICAL SIGNALS

FIELD OF THE INVENTION

The present invention relates to a technique for encrypting signals to be transmitted via optical communication lines, for example for protecting bank information on monetary transactions from hackers.

BACKGROUND OF THE INVENTION

Various techniques for encrypting analog and digital information are known in the art. The main feature of techniques for encrypting digital information is converting the data transmitted as a binary sequence and presented by high and low energy levels, into another binary sequence using a predetermined key or a system of keys. Knowing the key or the system of keys and applying them to the obtained binary sequence enables decryption of the digital information, i.e., returning it to the original binary sequence. Most of the known encryption techniques utilize a deterministic approach to the coding, even those methods introducing a random element into the technique (since they actually use pseudo-random principles).

It goes without saying that an unauthorized user will be able to decrypt the intercepted data if the key is somehow uncovered i.e., will be able to find a connection between the obtained encrypted binary data and the original binary data.

OBJECT OF THE INVENTION

It is an object of the present invention to provide a novel technique of encryption suitable for signals transmitted over optical lines.

SUMMARY OF THE INVENTION

The Inventors propose using a phenomenon of chromatic dispersion in an optical fiber for encrypting information transmitted over optical transmission lines.

In other words, there is provided a method of encrypting an optical signal to be transmitted via an optical fiber communication link by causing controlled chromatic dispersion of said signal.

The fiber chromatic dispersion (fiber dispersion) is a result of dependence of the fiber refractive index on the signal wavelength. Since an optic signal velocity in a fiber is given by $$V(\lambda) = \frac{c}{n(\lambda)} \tag{1}$$

where V(λ) is the signal velocity, C is the light velocity in vacuum and n(λ) is the fiber refractive index, the signal velocity also depends on the signal wavelength.

Because of the final spectral width of any optical pulse signal, its different parts will propagate through the fiber with different velocities causing the pulse distortion, which will be called the signal dispersion in the frame of the present application. As a result of this, various effects appear. For example, such effects are mutual interference between adjacent optical pulses within the optical channel (so-called inter-symbol interference ISI), and decrease of the pulse peak power. These effects are considered harmful, and specific techniques are usually required for overcoming them.

For compensating the fiber dispersion, one may use fibers with the dispersion characteristics opposite to those of the standard fiber. Such fibers are usually called dispersion compensating fibers (DCF).

One alternative technique for compensating the fiber dispersion uses chirped periodic structures to create different delays between signals of different wavelengths and therefore to compensate for the fiber chromatic dispersion. This technique is presented today by the chirped fiber Bragg gratings, for example described in a Japanese patent application JP 20002 35170 A. Arrangements belonging to this technique do not create non-linear interactions, the gratings have a small size and allow creating variable compensation modules.

To the best of our knowledge, the Applicant's idea that the negative phenomenon of signal dispersion could be used as means for encryption of optically transmitted digital signals, has not been yet realized or published.

In terms of a method and a device (system), the inventive idea can be further defined as follows:

A method for encrypting an optical signal to be transmitted via an optical fiber communication link between a transmitting site and a receiving site, comprising:

- obtaining an original optical signal,
- at the transmission site, encrypting the original optical signal by causing a controlled chromatic dispersion thereof,
- transmitting thus encrypted optical signal,
- at the receiving site, providing a suitably controlled compensation of the dispersion caused at the transmission site, thereby decrypting the encrypted signal to restore the original optical signal.

Upon such an encryption, any unauthorized user will be unable to restore the intercepted signal, since the encrypted signal constitutes a chromatically distorted original signal, while both the extent and the time order of the distortion can be controlled to make the original signal unrecognizable.

The proposed method is applicable to encryption of both digital and analog optical signals carrying information.

Creating the controlled signal dispersion can be provided by means capable of affecting chromatic dispersion in the original signal, using said means in a predetermined order and combination of the affecting operations.

In the analogous manner, the suitable controlled compensation of the dispersion can be effected by means capable of compensating chromatic dispersion created at the transmission site, using said means in the predetermined order and combination. The combination and order of operations affecting chromatic dispersion of the signal at the transmitting site to encrypt it, and at the receiving site to decrypt it, can be called the encryption-decryption key.

The key is preferably a function of time. It can be based, for example, on a pseudo-random sequence known at the receiving site and the transmission site. To be properly applied for encryption and then for decryption, the key should be synchronized with the original optical signal at the transmitting site, and that synchronization should be known at the receiving site i.e., the receiving site should be synchronized with the transmitting site from the point of encryption/decryption.

There is also provided an encryption device for encrypting an optical signal to be transmitted via an optical fiber communication link, the device being capable of causing controlled chromatic dispersion of said signal.

Likewise, a decryption device for decrypting an optical signal encrypted by the encryption device should be capable of causing controlled compensation of the chromatic dispersion introduced into said signal by the encryption device.

According to yet a further aspect of the invention, there is provided a system for encryption of an original optical signal to be transmitted via an optical fiber communication link between a transmission site and a receiving site, the system comprising

- a controllable encryption device at the transmission site, capable of causing for controlled chromatic dispersion of said original signal, and
- a suitably controllable decryption device at the receiving site, capable of compensating the chromatic dispersion caused at the transmission site as to obtain said original signal.

According to one preferred embodiment of the device (and the system), the encryption device can be implemented in the form of a so-called variable dispersion compensation module. Similarly, the decryption device can also be implemented using a similar variable dispersion compensation module.

For example, the variable dispersion compensation module may comprise a plurality of fiber sections having different dispersion characteristics and selectively connectable to the optical communication line.

Alternatively or in addition, the variable dispersion compensation unit may comprise a set of Bragg gratings.

In the system at its transmitting site, there is preferably a transmitter assembly combined from a conventional transmitter and the encryption device in the form of a variable dispersion compensation module, controlled (modulated) by some function of time called an encryption key.

Accordingly, at the receiving site of the system, there is preferably a receiver assembly comprising a conventional receiver and the decryption device controllable by a decryption key being a function of time. Knowing the key, one can synchronize the decryption device with the encryption device and set the dispersion at the receiving site to the desired function symmetric to that at the transmitting site so as to minimize the Inter Symbol Interference (ISI) and read the information properly. Otherwise the information read by the receiver will be distorted by the chromatic dispersion and a random illegible sequence will be obtained instead of the original signal.

BRIEF DESCRIPTION OF THE DRAWINGS

The invention can be further described and illustrated with the aid of the following non-limiting drawings in which.

DETAILED DESCRIPTION OF THE PREFERRED EMBODIMENTS

Figure 1:
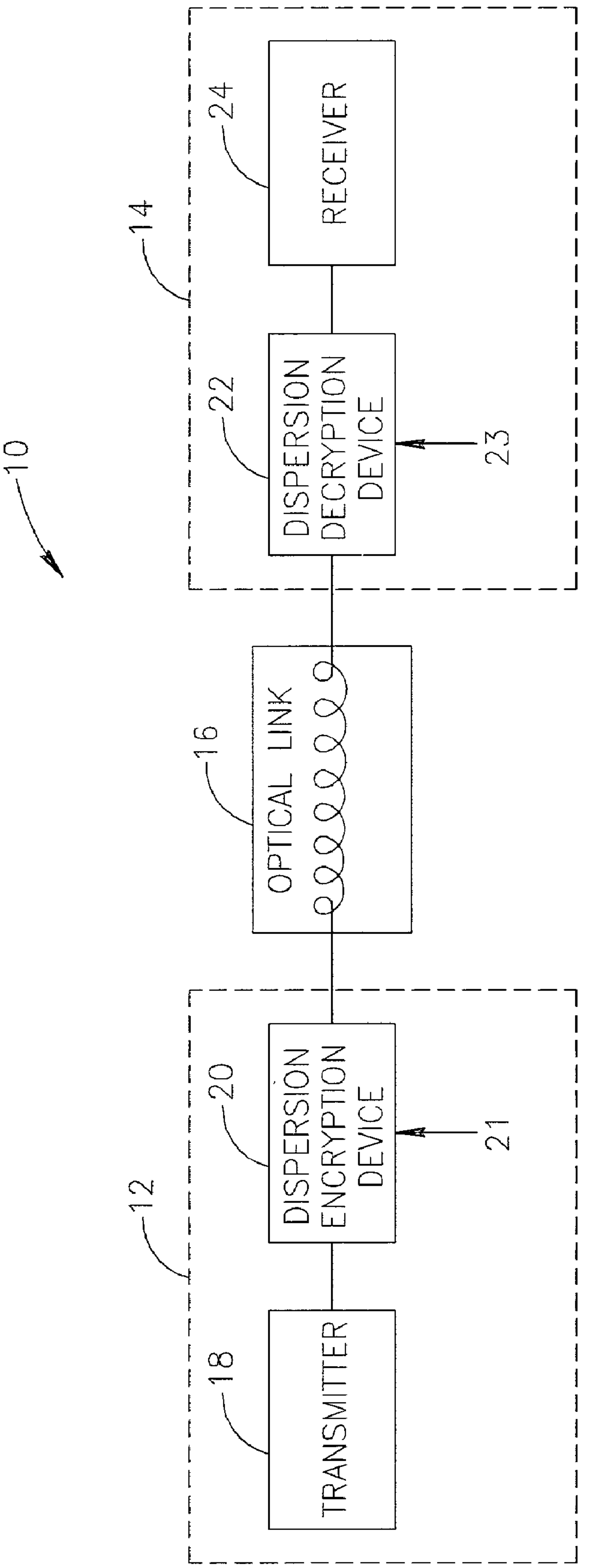
FIG. 1—is a schematic block-diagram illustrating the principle of the proposed invention

FIG. 1 illustrates the principle of the invention and the proposed system.

The system 10 for protected transmission of optical information comprises equipment at a transmitting site 12, equipment at a receiving site 14 and an optical link 16 connecting the sites 12 and 14. The optical link 16 basically consists of a conventional optical fiber having a particular length, but may also comprise additional network elements such as amplifiers and various passive elements. The link may also comprise OADM (Optical Add-Drop Multiplexer), and this example will be illustrated in FIG. 4.

The transmitting site equipment comprises a transmitter 18 and a dispersion encrypting device 20 which, preferably, is implemented as a controlled variable dispersion module. The transmitter 18 produces an original optical signal which is fed to the dispersion encryption device 20 and synchronized therewith. The device 20 is controlled by an encryption key which is a function of time (schematically marked 21). The encryption device changes its dispersion characteristics in the manner dictated by the key. The encrypted optical signal is a distorted original signal, which is further transmitted via the optical link 16.

The decryption device 22 receives the encrypted optical signal transmitted via the optical link 16 and applies to the signal a properly synchronized decryption key (schematically marked 23) which is also a function of time. The decryption key 23 is capable of causing the decryption device 22 to compensate the distorting action of the encryption device 20 and thus to restore the original optical signal which is finally fed to the receiver 24. Basically, the function of the decryption key 23 and the function of the encryption key 21 are symmetric relative to the axis of time.

For example, the encryption key may include positive and negative sections which would respectively reflect periods of introducing dispersion and periods of overcompensating; the function may also be characterized by various time derivatives of the dispersion.

However,some adjustments are to be effected at the decryption device 22, taking into account noise and other artifacts introduced by the optical link 16. Such adjustments may be introduced by slightly altering the function of the decryption key, for example by adding to it a constant negative or positive bias to compensate dispersion introduced by the fiber and/or other elements of the link 16.

Figure 2A:
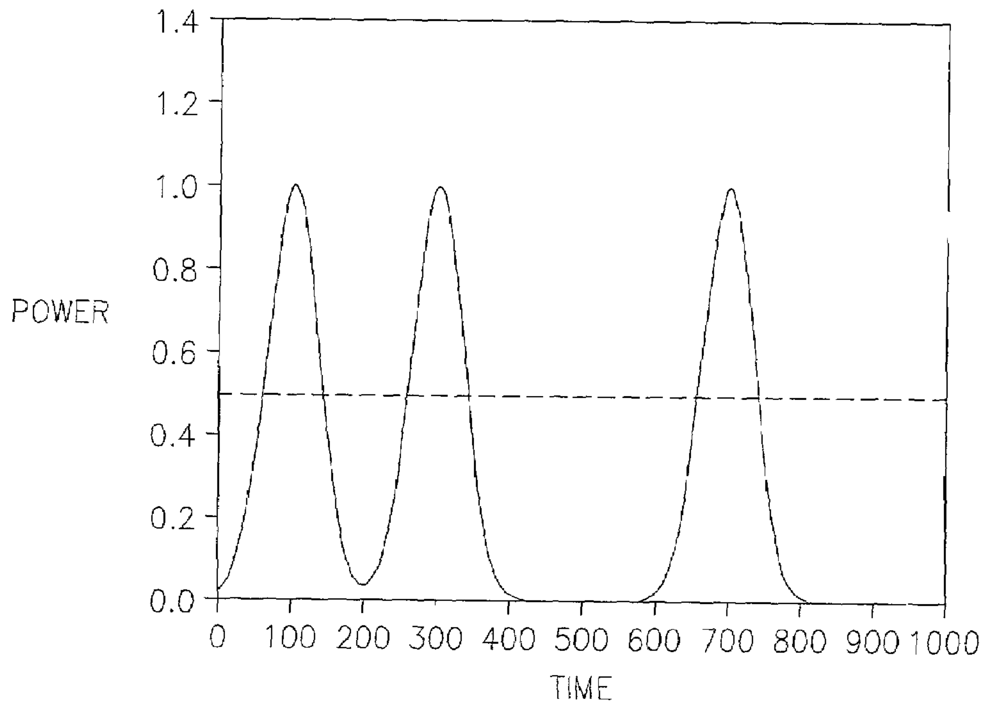
FIGS. 2*a*, 2*b*, 2*c* illustrate, using simple examples, the principle of encrypting optical information by controlling chromatic dispersion of the optical signal.
Figure 2B:
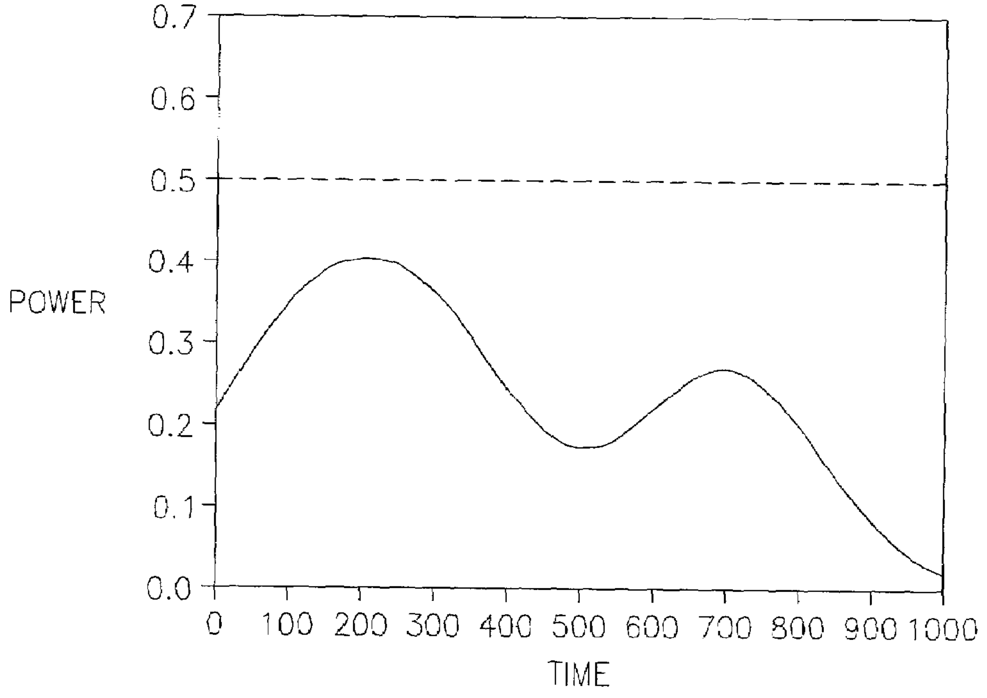
Figure 2C:
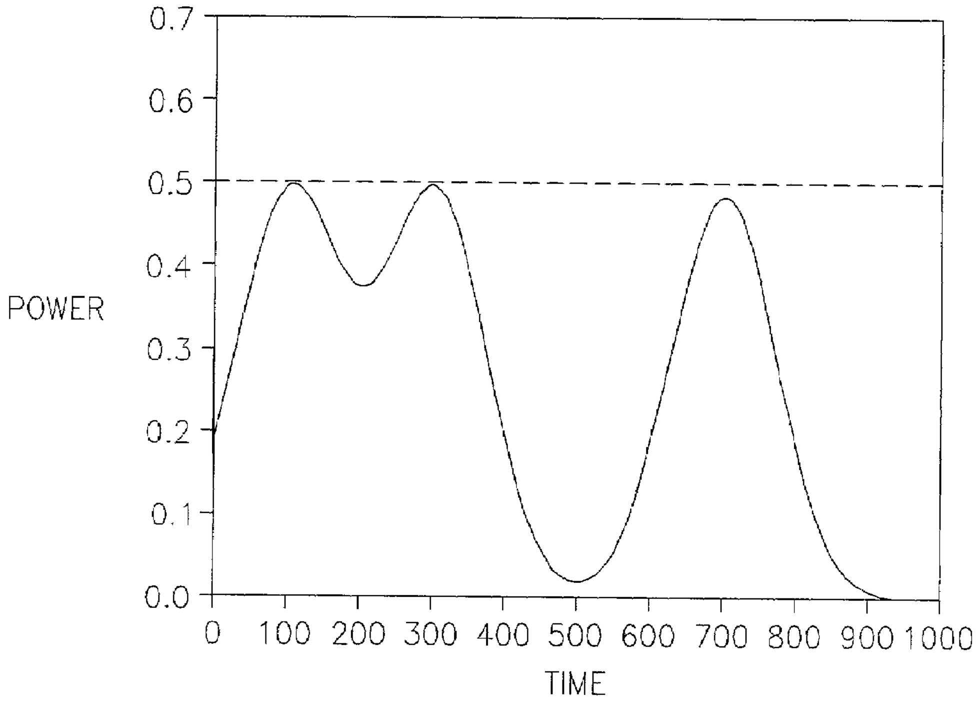

FIGS. 2*a*, 2*b* and 2*c* show, how an original optical signal can be distorted by encrypting it using a simplest dispersion encryption device.

Let us consider the system 10, comprising the transmitter 18, the tunable dispersion device 20 and the optical fiber link 16 having the length of 20 km, allows changing the initial chromatic dispersion of the original signal by the device 20 in the range analogous to the dispersion of +/−200 km of a standard fiber (negative sign refers to overcompensation of the dispersion).

FIG. 2*a* shows an exemplary binary sequence "1 1 0 1" produced by the transmitter 18 as an original optical signal. This sequence, would the system comprise the optical transmission link 16 directly connected to the transmitter 18, would have propagate as the sequence of pulses of the Gaussian shape. The receiver decision threshold is set in this example for the half maximum of the initial amplitude as one can see in FIG. 2*a*.

FIG. 2*b* illustrates the distorted signal which will propagate via the system if the transmitter 18 produces the same original optical signal while the variable dispersion encryption device 20 is set to introduce a constant dispersion value equivalent to +160 km (additional 160 km) of the optical fiber. In this example, the encryption key is the simplest and constitutes just a constant value. It can be seen that the peak power of all the distorted pulses is below the threshold now, and actually, the word "0 0 0 0" could be read instead of the original binary sequence. Without knowing how the encryption is synchronized with the signal, and which bit rate is used in the particular transmission, the encrypted information cannot be decrypted. Indeed, without knowing these factors, the decryption cannot be performed even if the decision threshold is shifted and even when the key somehow becomes known.

To restore the original optical signal, the dispersion decryption device at the receiving site should be set to (−180 km) to compensate the dispersion site and in the fiber link having the length of 20 km, and be synchronized with the transmitting site.

FIG. 2*c* presents another example of a simple encryption key. The distorted signal is shown, obtained if the dispersion encryption device is set to a constant dispersion which is equivalent to the dispersion value (−200 km), i.e. which would be obtained upon compensation of dispersion which could be introduced by an optical fiber having the length of 200 km. In this case the peak powers are very close to the decision threshold and practically a random word will be obtained because of the system noise and other impairments.

For decrypting the encrypted data, the receiving site should be arranged so that, beginning from a specific moment, start introducing the dispersion having the value equivalent to about (+180 km).

Figure 3:
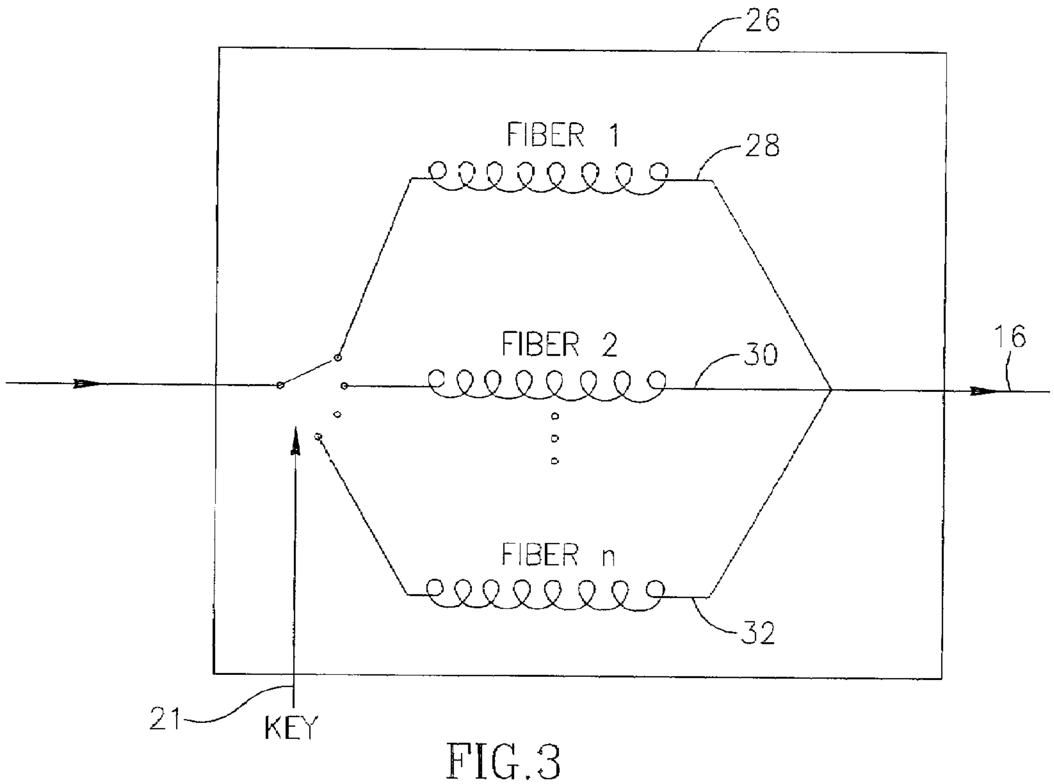
FIG. 3—is a schematic block-diagram illustrating one embodiment of the encryption unit according to the invention.

It is understood that in practice, more complex encryption/decryption keys can be used, comprising time periods of artificially introduced dispersion having various values and signs. FIG. 3 illustrates one exemplary schematic embodiment 26 of the dispersion encryption device which is based on a controlled variable dispersion module. The module, in this example, comprises a number of fiber sections (Fiber 1, Fiber 2, . . . Fiber n) marked 2, 30 and 32, which are selectively connectable to the optical communication link 16 according to the order set by the key 21. The fiber sections may be manufactured from fibers with different dispersion characteristics (say, among them there may be conventional fiber sections and sections of the DCF fibers). They may have different lengths. According to the key, the sections may be connected to the transmission line in a pseudo-random order and for different time periods thus forming a unique pattern of encryption. The dispersion decryption device suitable to the described encryption device is preferably built based on the same principle, and, when synchronized with the encryption device, should connect to the transmission line 16 such a fiber section in its module, which would compensate action of the fiber section active in the module of the encryption device at the corresponding moment.

Figure 4:
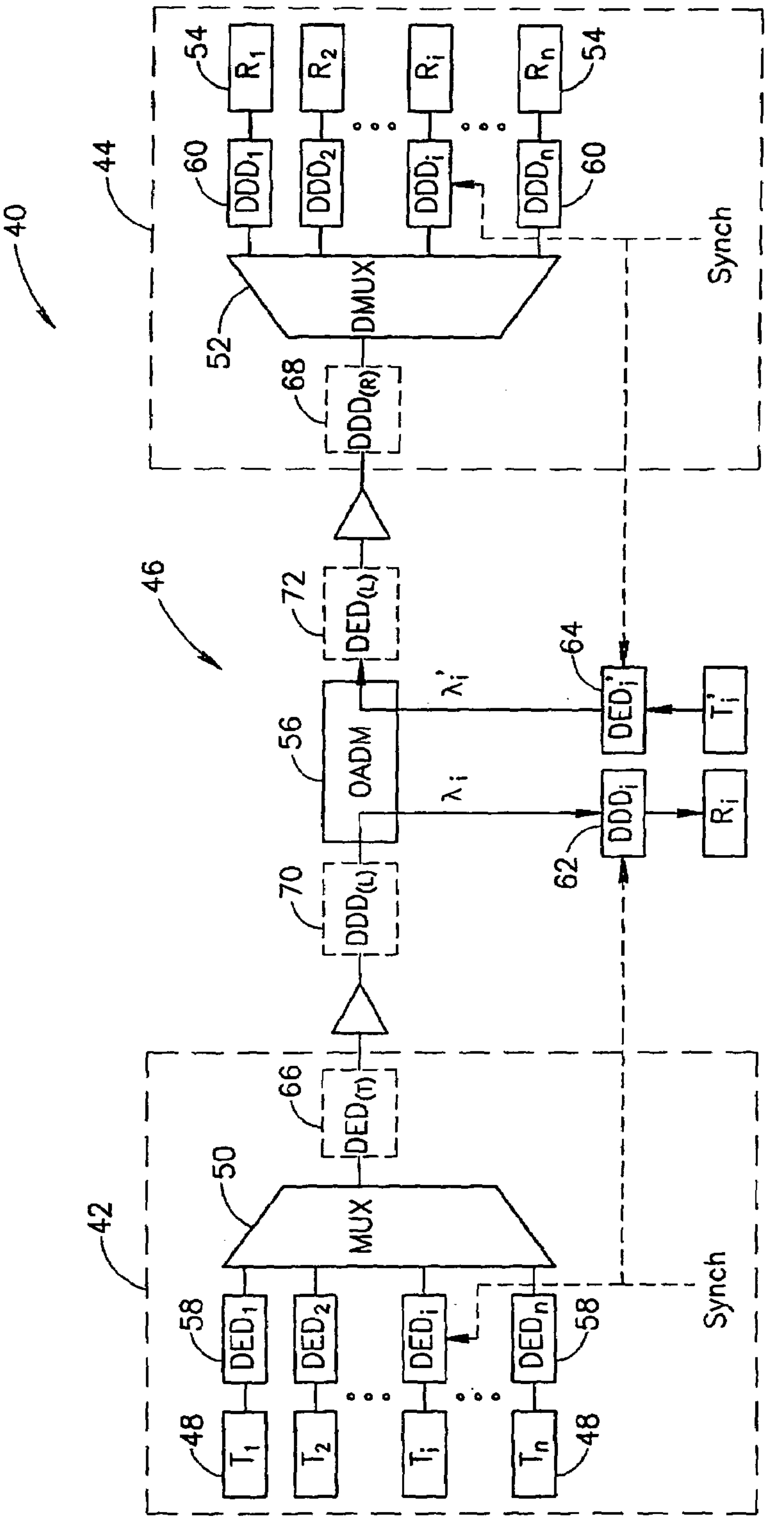
FIG. 4—illustrates one embodiment of implementing the inventive concept for the multi-channel optical transmission.

FIG. 4 illustrates how the inventive principle can be implemented in a multi-channel optical transmission system, such as a Wavelength Division Multiplexing system (WDM). The system 40 comprises a transmitting site 42, a receiving site 44 and an optical communication link 46. The transmitting site comprises transmitters 4 T1, T2, . . . Tn) of "n" optical information channels each characterized by its particular wavelength. For transmitting information of "n" the optical channels via one common optical fiber communication link 16, the optical signals are multiplexed by the optical multiplexer (MUX) 50. At the receiving site 44, the optical signal from the link 46 is demultiplexed by the demultiplexer (DMUX) 52, upon which the optical channels are received by their respective receivers 54 (R1, R2, . . . Rn).

If the optical communication link comprises an OADM 56 (Optical Add Drop Multiplexer), some of the optical channels are dropped, and some are added between the transmitting site and the receiving site. To protect the information transmitted in any of the optical channels via the link 46, a number of embodiments of the present invention can be proposed.

a) each optical channel can be encrypted by its own Dispersion Encryption Device (DED 1, DED2, . . . DEDn) 58, before being multiplexed at the transmitting site. The encryption keys of different DED 58 may be different. Accordingly, each optical channel can be decrypted at the receiving site by their own Dispersion Decryption Device (DDD1, DDD2, . . . DDDn) 60. Keys of the respective DED 58 and DDD 60 should correspond to one another and be synchronized.

However, if a particular optical channel (i) is dropped by the OADM 56, an individual DDDi 62 can be provided before the receiver Ri. The DDDi 62 should have the key suitable to the key of the DEDi 58 and be synchronized with it. Likewise, if a particular optical channel (i) is added at the OADM 56 to replace the dropped one, it can be first encrypted by a DEDi' 64, then added to the link 46 and decrypted, upon demultiplexing, by a DDDi 60 at the receiving site. The DDDi 60 and the DEDi' 64 should have a suitable encryption/decryption key and be synchronized.

b) Alternatively, the multi-channel information can be encrypted at the transmitting site by a common DED(T) 66 (shown by dotted lines), and decrypted by a common DDD (R) 68 at the receiving site. If OADM is inserted in the optical communication link, it can be provided with a local DDD(L) 70 at its input, and a local DED(L) 72 at its output. All the devices 66, 68, 70 and 72 may use similar encryption/decryption keys, but should be suitably synchronized. However, the DED 66 and DDD 70, and DED 72 and DDD 68 may work in pairs, so that each of the pairs has its own encryption/decryption key.

c) Various combinations of the per-channel encryption described in a) and common encryption described in (b) can be proposed, i.e. the encryption technique may include encryption of both information transmitted via a particular optical channel, and information transmitted over a particular optical fiber.

It should be appreciated that other patterns of the encryption/decryption keys, and other implementations of the dispersion encryption/decryption device can be proposed and should be considered part of the present invention.

The invention claimed is:

1. A method of encrypting an optical signal to be transmitted via an optical fiber communication link by causing controlled chromatic dispersion of said signal using steps of ensuring a variable dispersion compensation module inserted in the optical fiber communication link, performing controlled change of dispersion within the optical fiber communication link using said variable dispersion compensation module.

2. The method according to claim 1, for encrypting an optical signal to be transmitted via an optical fiber communication link between a transmitting site and a receiving site, comprising:

obtaining an original optical signal, at the transmitting site, encrypting the original optical signal by causing said controlled chromatic dispersion thereof, transmitting the encrypted optical signal, at the receiving site, providing a suitably controlled compensation of the dispersion caused at the transmitting site using steps of ensuring an additional variable dispersion compensation module inserted in the optical fiber communication link close to the receiving site, performing controlled change of dispersion within the optical fiber communication link using said additional variable dispersion compensation module, thereby decrypting the encrypted optical signal to restore the original optical signal.

3. The method according to claim 1, comprising causing the controlled chromatic dispersion of the optical signal by controlling said variable dispersion compensation module in a predetermined order and combination for distorting said optical signal to a desired extent.

4. The method according to claim 2, comprising synchronized applying of an encryption key and a decryption key to said variable dispersion compensation module and said additional variable dispersion compensation module respectively, for suitably controlling the chromatic dispersion during the encrypting and the decrypting.

5. The method according to claim 4, wherein said encryption key and decryption key are functions of time each reflecting a combination and order of operations affecting chromatic dispersion of the original signal and the encrypted signal, respectively.

6. An encryption device for encrypting an optical signal to be transmitted via an optical fiber communication link, the device being capable of causing controlled chromatic dispersion of said signal and comprising a variable dispertion compensation module inserted in said optical fiber communication link at its transmitting side.

7. The encryption device according to claim 6, controlled by an encryption key.

8. The encryption device according to claim 7, wherein the encryption key is a function of time.

9. The encryption device according to claim 7, wherein the variable dispersion compensation module comprises a plurality of fiber sections having different dispersion characteristics and selectively connectable to the optical communication link.

10. A decryption device for decrypting an optical signal encrypted by the encryption device according to claim 6, the decryption device being capable of causing controlled compensation of chromatic dispersion introduced into said signal by the encryption device and comprising a variable dispersion compensation module inserted in said optical fiber communication link at its receiving side.

11. A system for encryption of an original optical signal to be transmitted via an optical fiber communication link between a transmitting site and a receiving site, the system comprising a controllable encryption device at the transmitting site, capable of causing for controlled chromatic dispersion of said original signal, and implemented as a variable dispertion compensation module inserted in said optical fiber communication link, and a suitably controllable decryption device at the receiving site, capable of compensating the chromatic dispersion caused at the transmitting site so as to obtain said original signal and implemented as an additional variable dispertion compensation module inserted in said optical fiber communication link.

12. The system according to claim 11, wherein said controllable encryption device is controlled by an encryption key.

13. The system according to claim 11, wherein said controllable decryption device is controlled by a decryption key.

14. The system according to claim 11, wherein both said encryption device and said decryption device are controllable in synchronism by an encryption key and a decryption key respectively.

15. The system according to claim 14, wherein said keys are functions of time.

16. The system for encryption according to claim 11, adapted to a multi-channel optical transmission system.

17. The method according to claim 1, wherein said variable dispersion compensation module comprises a plurality of fiber sections having different dispersion characteristics, the method comprises selectively inserting said fiber sections into the optical communication link.

18. The decryption device according to claim 9, wherein the variable dispersion compensation module comprises a plurality of fiber sections having different dispersion characteristics and selectively connectable to the optical communication link at its receiving side.

19. The system according to claim 11, wherein at least one of said variable dispersion compensation modules comprises a plurality of fiber sections having different dispersion characteristics and selectively connectable to the optical communication link.

* * * * *